Sept. 5, 1939.　　　　　J. MIHALYI　　　　　2,172,337
TWO PART ROLL HOLDING CAMERA
Filed July 13, 1937　　　4 Sheets-Sheet 1
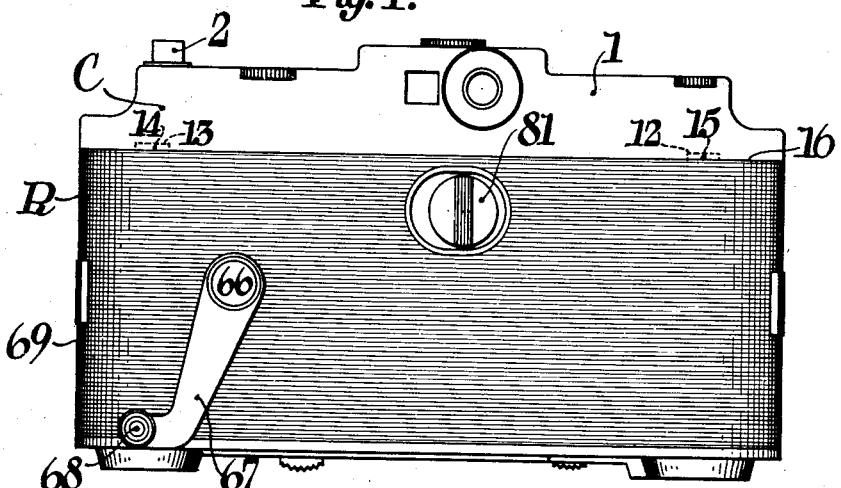
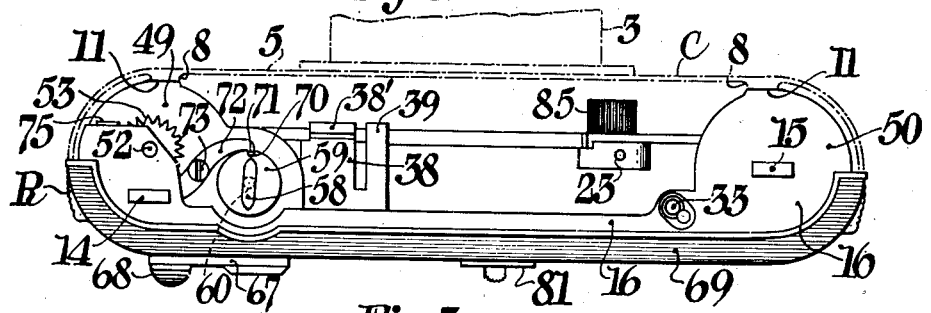
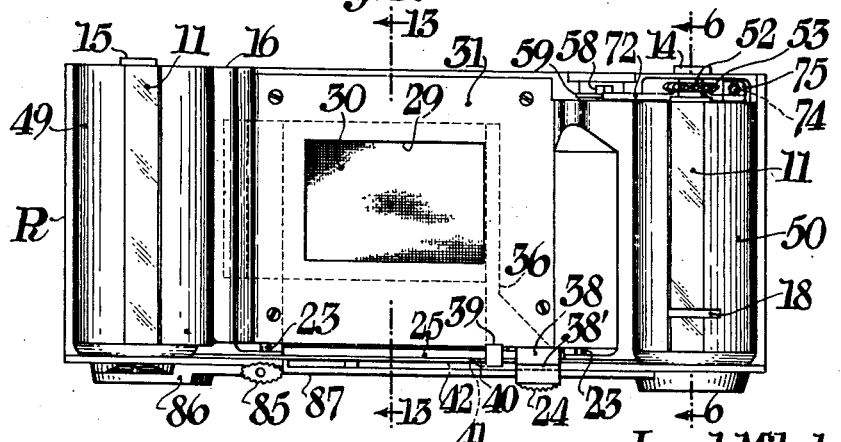
Joseph Mihalyi,
INVENTOR
BY Newton M. Perrins
　　Donald H. Stewart
　　　　　　ATTORNEYS.

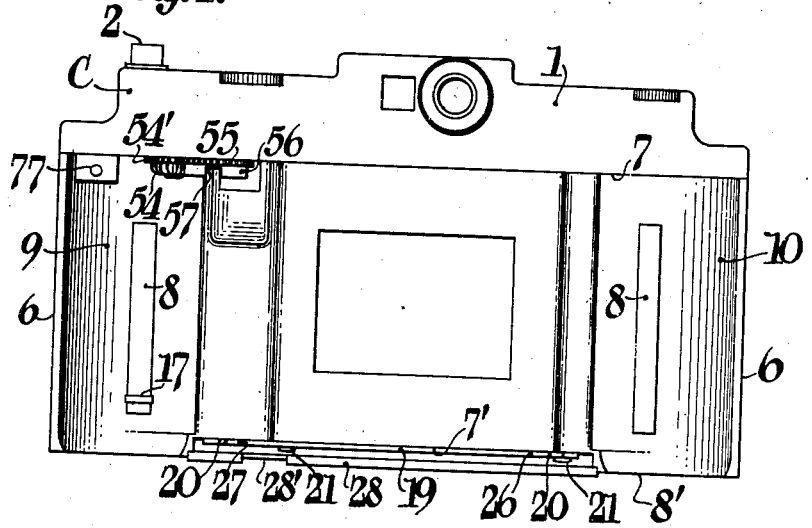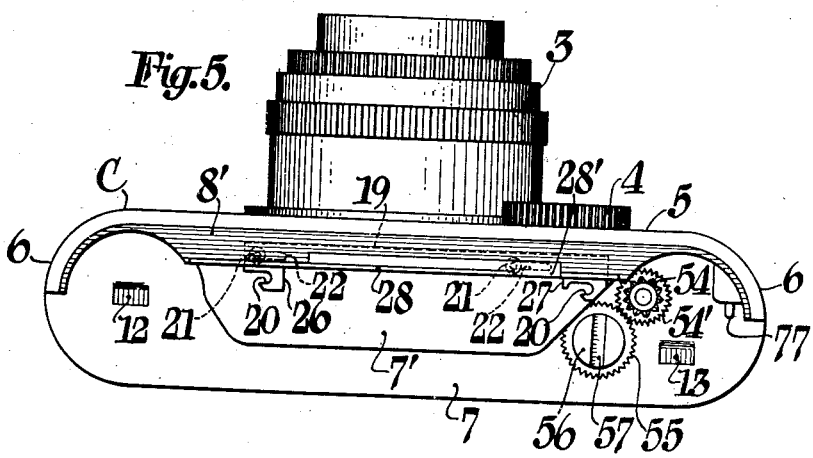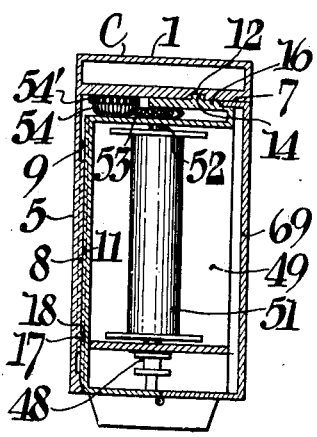

Sept. 5, 1939.   J. MIHALYI   2,172,337
TWO PART ROLL HOLDING CAMERA
Filed July 13, 1937   4 Sheets-Sheet 3

Joseph Mihalyi,
INVENTOR:
BY
ATTORNEYS.

Sept. 5, 1939.                J. MIHALYI                2,172,337
                    TWO PART ROLL HOLDING CAMERA
                    Filed July 13, 1937        4 Sheets-Sheet 4
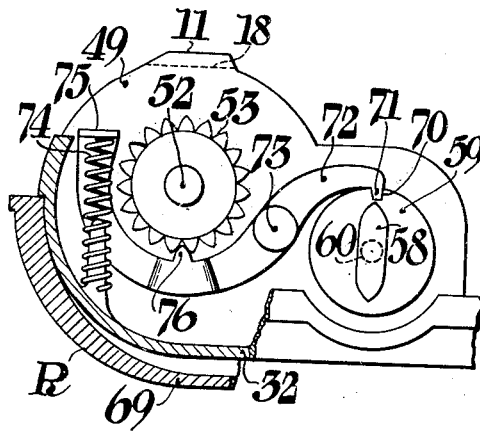
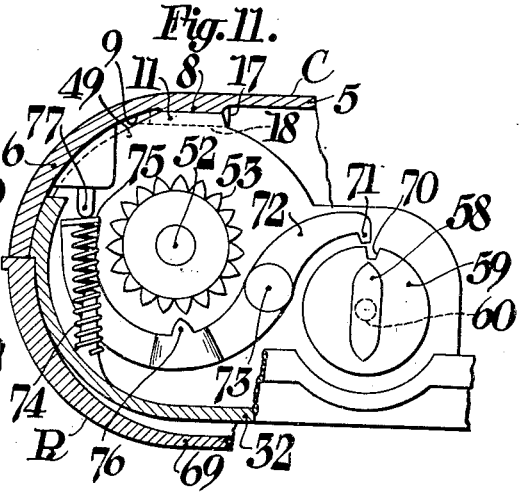
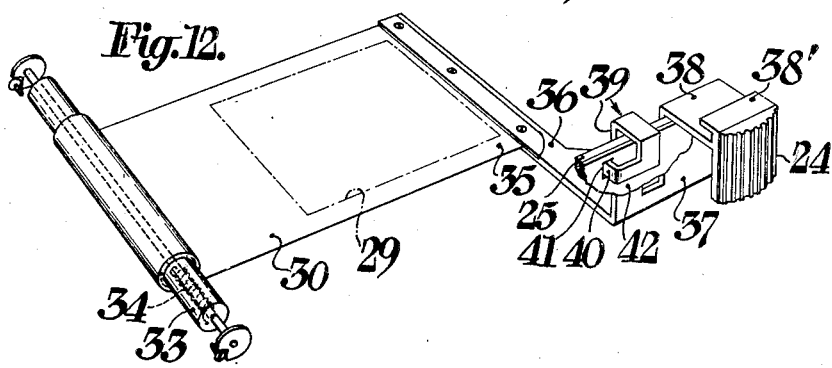
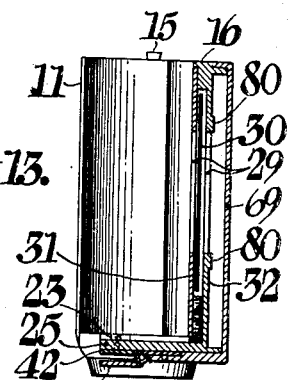
Joseph Mihalyi,
INVENTOR.
BY Newton M. Perins
Donald H. Stewart
ATTORNEYS.

Patented Sept. 5, 1939

2,172,337

UNITED STATES PATENT OFFICE 2,172,337

TWO PART ROLL HOLDING CAMERA

Joseph Mihalyi, Rochester, N. Y., assignor to Eastman Kodak Company, Rochester, N. Y., a corporation of New Jersey Application July 13, 1937, Serial No. 153,352
In Germany January 6, 1937

21 Claims. (Cl. 95—31)

This invention relates to photographic cameras and particularly to photographic cameras equipped with removable roll holders.

One object of my invention is to provide a camera the body of which is only partially incomplete in itself, and a roll holder which completes the camera and which, when mounted on the camera appears to be an integral part thereof. Another object of my invention is to provide a camera to which various roll holders may be attached and to provide suitable interlocking mechanisms between the camera and roll holder which will insure against fogging the film and which will insure the proper relationship of the interengaging parts. Another object of my invention is to provide a camera body on which different roll holders may be interchangeably mounted—as, for instance, may be required for films of different sizes or types and such as may be required for black and white and color photography. Another object of my invention is to provide a roll holder with a film winding mechanism and to provide, on the roll holder and camera, interengaging parts so that a camera shutter may be simultaneously tensioned as film is wound in the roll holder. Another object of my invention is to provide a camera latch which can only be operated when a light obstructing curtain has been moved across an exposure frame of the roll holder. Another object of my invention is to lock the film winding mechanism on the roll holder except when the back has been properly positioned on the camera body. Another object of my invention is to provide a roll holder with accurately shaped positioning means adapted to cooperate with accurately shaped positioning means on the camera body. so as to insure that the film will lie accurately in the focal plane of the camera objective. Another object of my invention is to provide a means for detachably and securely attaching a roll holder to a camera body so that the camera and roll holder will appear as an integral unit and may be used as such. Still another object of my invention is to provide a camera of extremely small size, certain exterior walls of which are composed of parts of a reversible roll holder and other objects will appear from the following specification the novel features being particularly pointed out in the claims at the end thereof.

Coming now to the drawings wherein like reference characters denote like parts throughout:

Fig. 1 is a rear elevation of a camera with a roll holder attached thereto constructed in accordance with, and embodying a preferred form of my invention.

Fig. 2 is a top plan view of the camera roll holder shown in Fig. 1 with portions of the camera shown in broken lines to show interengaging parts.

Fig. 3 is a front elevation of a camera roll holder removed from the camera shown in Fig. 1.

Fig. 4 is a rear elevation of the camera shown in Fig. 1 but with the roll holder removed.

Fig. 5 is a bottom plan view of the camera shown in Fig. 4 with the roll holder removed.

Fig. 6 is a section taken on line 6—6 of Fig. 3 showing certain exterior walls of the camera and roll holder to indicate the relation of these parts.

Fig. 10 is a fragmentary detail, parts being shown in section, of a latch mechanism for holding the film winding mechanism in a fixed position when the roll holder is removed from the camera.

Fig. 11 is a view similar to Fig. 10 but with the parts shown in position to permit film winding with the roll holder mounted on the camera.

Fig. 12 is a fragmentary perspective view of the curtain which serves as a dark slide when the roll holder is removed from the camera.

Fig. 13 is a section on line 13—13 of Fig. 3.

Figure 7:
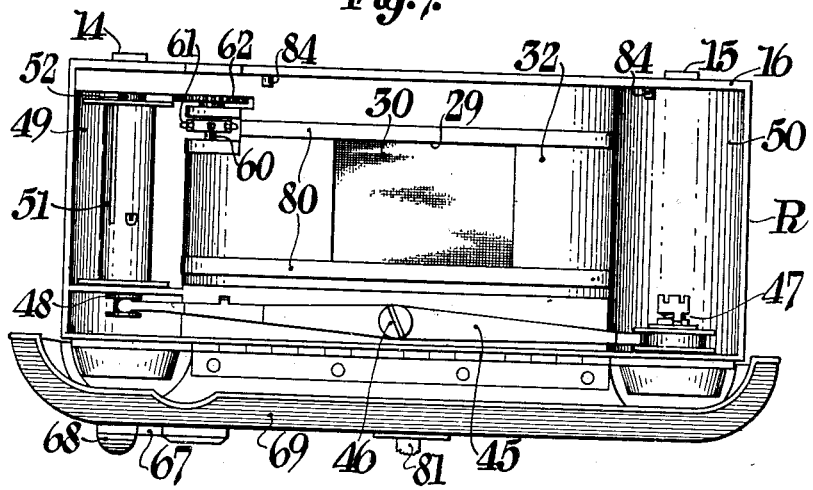
Fig. 7 is a perspective view of the camera roll holder removed from the camera with the roll holder back swung open into a film loading position.
Figure 8:
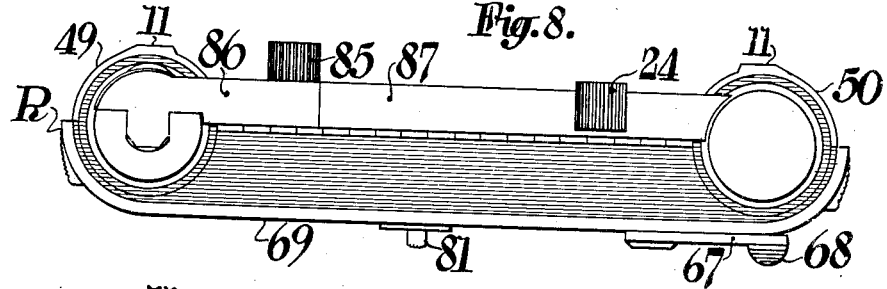
Fig. 8 is a bottom plan view of the roll holder removed from the camera.

In order to be most serviceable for present day photography, it is desirable to have a camera which is equipped for taking black and white or color pictures. It is also desirable to provide a single camera with means for utilizing film of different types, such as lengths of 35 mm. perforated motion picture film, which is usually prepared by packing in retorts containing 18 or 36 exposures, or film of the same general size which may be unperforated or which may bear a single perforation for each exposure which is usually wound with a light-protective cover of paper on film spools in shorter lengths. Since it is frequently desirable to take color pictures and black and white pictures of the same subject with the same camera, it is desirable to provide a camera with roll holders which are readily removable and which can be quickly interchanged.

In the following specification, I will describe a preferred embodiment of my invention in which the camera is of the so-called miniature type adapted to take pictures approximately 24 x 36 mm. or 28 x 40 mm. these being standard small sizes. Obviously, my construction would also be useful for photographic apparatus of other sizes. It is understood that the drawings are intended merely to illustrate one embodiment of my invention.

As indicated in Fig. 1, the camera may consist of a body portion C the upper part 1 of which may be roughly rectangular in shape and may include the parts of the camera which control the actuation of the shutter, range finder, shutter timing and other mechanism. The shutter trigger 2 may be conveniently mounted on top of the housing 1 and a camera roll holder, designated broadly as R, may be mounted on the camera body C. The camera body C is incomplete in itself, but when a complementary shaped roll holder is attached, these two parts form a complete camera which may be used as a unit. The camera body C carries the objective and shutter, and the roll holder the film. Both have interengaging and interlocking parts which cooperate when assembled, as a single unit.

As indicated in Fig. 5, the camera C preferably carries a suitable mounted objective 3 which may be focused by a knurled ring 4. The camera body C as indicated in this figure is incomplete in itself, and consists of a front wall 5, part end walls 6, and a top wall 7 between which and the flanged portion 8' a roll holder may fit  The top wall 7 supports the housing 1 above referred to. It will be noted that the camera does not have a complete bottom wall, end walls or a rear wall. These walls will be completed when the roll holder R is placed in position on the camera as illustrated in Fig. 1. The camera body C and roll holder R are complemental in shape.

The camera body is provided with a pair of accurately shaped spaced pads 8 which are here shown in the form of ribs lying on the curved end walls 10. These ribs are also indicated in Fig. 2 and are preferably formed in such a way that they can be accurately machined to the proper height.

Since camera body C carries an objective 3 and since a removable roll holder R carries the film, it is important that the film be held accurately in the focal plane of the objective. The camera magazine is also provided with a pair of spaced and accurately faced ribs 11 which, as indicated in Fig. 2, are adapted to contact with the ribs 8 to definitely locate the roll holder with respect to the camera body.

As indicated in Fig. 5, the camera body is provided with a pair of recesses 12 and 13 which are adapted to receive complementary shaped lugs 14 and 15 carried by a top wall 16 of the roll holder. These lugs may be entered into the recesses and by swinging the roll holder beneath the top housing 1 of the camera, these interengaging members together with a rib 17 and complemental shaped recess 18 on the camera and roll holder will be engaged as indicated in Fig. 6. Thus, the top of the magazine is held beneath the top of the camera and the bottom of the magazine is held against downward movement away from the top by the interengaging members 17 and 18.

A latch shown in Fig. 5 is used to hold these parts in the position shown in Fig. 6. This latch consists of a slideable bar 19 having hooks 20 on each end, this bar being mounted to slide upon the studs 21 which pass through slots 22 in the bar. These hooks 20 engage pins 23 carried by the roll holder and best shown in Fig. 3.

In order to move the latching bar 19, there is a handle 24 which is mounted to slide on the rail 25 carried by the roll holder between two different positions in one of which a handle strikes an edge 26 of the sliding bar 19 to move the hooks 20 into engagement with the pins 23 and in the other of which the handle strikes the hook edge 27 to move the hooks away from the pins 23. It will thus be seen that there is a lost motion connection between the sliding handle 24 and the latching bar so that the handle 24 must slide all the way across an exposure aperture 29 before the latching or unlatching movements can be accomplished.

The reason for this is that the handle 24 is used to operate a curtain 30 which is adapted to close the exposure frame 29 before the roll holder can be removed from the camera so as to form a light-tight protection for unexposed film.

It should also be noted that since handle 24 must pass through notch 28' to slide behind rail 28 (Fig. 5) the roll holder R cannot be either taken off or put on the camera C without first moving handle 24 to a predetermined position.

Referring to Figs. 12 and 13, the roll holder preferably consists of a pair of spaced walls 31 and 32 which form a narrow passageway each of these walls having an exposure aperture 29. A curtain 30 is mounted on a spring roller 33 to one side of the exposure opening, and lies between the walls 31 and 32. The roller is so arranged that a spring 34 normally tends to wind the curtain on the roller. However, one end, 35, of the curtain is attached to a rod 36 which in turn is formed upwardly at 37 and outwardly at 38 to support the handle 24. When the handle 24 slides on the roll holder, the curtain is drawn across the aperture 29. After the curtain has covered the aperture, the handle 24 strikes the latching bar lug 27 and moves the latch to the position shown in Fig. 5 in which the hooks 20 are released from the pins 23 and the roll holder may be removed from the camera.

In order to prevent the handle 24 from being moved when the roll holder is off of the camera and thus fogging film lying across the exposure aperture, the latch mechanism shown in Fig. 12 is used. On the offset 37, there is a spring arm 39 formed by bending the metal in the shape shown, there being a latching end 40 bent inwardly. The spring in the metal tends to hold the latch 40 in a latching opening 41 carried by the plate 42 of the roll holder so that when the handle 24 is moved to the position shown in Fig. 3 for removing the roll holder from the camera, the handle will be latched in the position shown against movement.

To release this latch 40—41 the spring arm 39, it is positioned in the path of a portion of the camera so that, when the roll holder is placed on the camera, a flange 7', carried near the bottom wall of the camera will strike the latch and, as indicated in Fig. 12, will move it in the direction shown by the arrow so that the latch elements 40, 41 will become disengaged. It is then possible to move the handle 24 in a direction (which is to the left with regard to Fig. 3 of the drawings) to open the exposure aperture. Thus, it is impossible to latch the roll holder on the camera without first opening the exposure window and it is, therefore, impossible to operate the camera with the curtain 30 closing the exposure aperture 29.

The rocker arm 45 pivoted on stud 46 on the camera back is for operating clutch members 47 and 48 so that the film can be wound first on a take-up reel from a supply reel after the take-up reel has been unclutched. This construction need not be further described since it is exactly like the film winding mechanism shown in my copending application Serial No. 145,497, filed May 29, 1937, except that in the application this mechanism is included in a camera of which the roll holder is an integral part instead of a roll holding back which may be removed from the camera as in the present instance.

The roll holder is provided with a pair of spaced film spool chambers 49 and 50 at opposite ends of the spaced plates 31 and 32 and film may be wound from the supply reel in spool chamber 50 to a take-up reel 51 in spool chamber 49 in the following manner: The spool 51 may be rotated by a shaft 52 by means of a gear 53 (Fig. 9) which meshes with a gear 54 (Fig. 5) mounted upon the same shaft with a gear 54' and this gear in turn meshing with still another gear 55 carrying a disc 56 slotted at 57.

When the camera back is placed in position on the camera, the gear 53 will mesh with gear 54 of the camera and the slot 57 of the disc 56 will receive a web 58 which is carried by a disc 59 connected to a shaft 60 carrying a film sprocket 61 adapted to turn one revolution each time a fresh area of film is wound into place. This may be accomplished by means of a gear 62 also affixed to shaft 60 which is adapted to mesh with the dished gear 63 shown in Fig. 9 as having a pawl 64 and ratchet 65 connection with a shaft 66 so that it may be turned in one direction by an oscillatable lever 67 which may be operated by a handle 68 carried by the hinged back 69 of the roll holder. This construction need not be further described because it forms a subject of my copending application for "Camera winding device", Serial No. 137,483, filed April 17, 1937.

It is obvious that it is necessary to hold the web 58 in alignment with the slot 57 in order to assemble the roll holder and camera. It is, of course, also desirable to have the film remain in the set position during all of the time that the roll holder is removed from the camera. To accomplish this, as indicated in Figs. 10 and 11, the disc 59 is provided with a notch 70. This notch is adapted to receive a lug 71 carried by a lever 72 and this lug is spring pressed into the notch by means of the spring 74. This spring always tends to lock disk 59 in place through pressure on the flange 75, which turns lever 72 about the stud 73. The locking position is shown in Fig. 10. At the same time, since lever 72 carries a second lug 76, the gear 53 may be latched in a fixed position because a tooth of the gear is engaged by lug 76 when the latched member 72 is in operative or latching position.

When the roll holder is placed on a camera, a pin 77 on the camera end wall 66 engages the flange 75 swinging the lever 72 about the stud 73 to release both of the locking lugs 76 and 71 from their cooperating latch elements—that is, from a tooth of the gear 53 and from the notch 70. Thus, as soon as the roll holder is placed on the camera, the film is unlocked. When removed from the camera the film is locked in position so that it cannot be moved until the roll holder is replaced on the camera.

Figure 9:
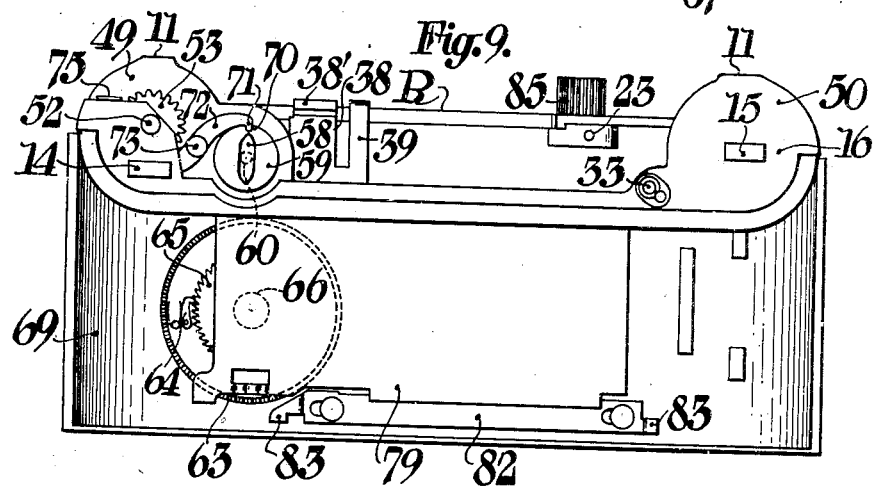
Fig. 9 is a top plan view of the roll holder removed from the camera with the roll holder back in an open or film loading position.

Referring to Fig. 9, the dished winding gear 63 together with the pawl 64 and ratchet 65 lie between the roll holder back 69 and a pressure plate 79 which may be spring pressed to hold a film flat on the film locating rails 80, best shown in Fig. 7. These rails may be accurately ground in proper spaced relation to the locating rails 11 of the roll holder so that the film will always lie in the proper plane with respect to the camera objective. These rails 80 preferably extend at right angles to the locating rails 11 in the semi-cylindrical spool chambers.

The hinged roll holder back may be latched in place with any suitable latching mechanism, here shown as a sliding latch 81 on the camera back which may be turned to move the latching bar 82 so that the ends of the bar 83 may be moved to and from locking engagement with the pins 84 on the top wall of the roll holder as shown in Fig. 7.

It should be noted that the roll holder is a complete light-tight unit adapted to contain spools of film with a length of film stretched across the exposure aperture 29. The roll holder likewise carries the safety curtain 30 which must cover the aperture 29 before the roll holder can be removed from a camera. Thus the roll holder forms a rear wall for the camera and half end walls for the camera and it likewise forms half of a bottom wall of the camera. When the roll holder is on the camera, it conforms to the outside contour thereof and can be operated just as the normal camera is operated since films can be loaded into the roll holder by releasing the latch 81 and swinging the back open without removing the roll holder from the camera. In fact, this is the normal way that the roll holder is used. However, if an operator should desire to substitute a second or third roll holder which has been previously loaded with this type or size of film, he can readily do so by merely moving the latch member 24 as above described.

On the bottom wall of the roll holder, there is shown a handle 85 which is attached to a crank 86 on the bottom wall 87 of the roll holder. This is a rewinding handle by which the film can be wound back on a supply reel when the rocker bar 45 is moved as is fully described in my copending application Serial No. 145,497.

In order to make the camera compact and so that it may have pleasing, smooth exterior walls, I prefer to finish the roll holder walls and the camera walls in the same manner. In other words, the complementary shaped camera and roll holder walls which, when assembled, form a complete camera, may be covered with the same material such as leather and may be finished so that they will look like a unitary structure. The camera body includes a top wall which may be in the form of a box-like housing 1 as well as a front wall and half end and bottom walls. The front half end and bottom walls are preferably covered with leather as are also the half end, half bottom, and rear wall carried by the camera roll holder. This arrangement of camera and roll holder walls is particularly desirable because it permits the roll holder to be quickly and easily attached to and removed from the camera and because it makes possible a construction in which the film can be very accurately held in a focal plane with respect to an objective carried by the camera.

What I claim and desire to secure by Letters Patent of the United States is:

1. In a roll holding camera the combination with an incomplete camera body comprising a top wall in the form of a box-like housing, a front wall, half end and bottom walls, of a roll holder adapted to be removably attached to said camera body for completing the camera and including a rear wall, half end and bottom walls all complementary in shape to the walls of the camera, whereby said walls when assembled may form the complete and smooth exterior walls of the camera.

2. In a roll holding camera the combination with an incomplete camera body comprising a top wall in the form of a box-like housing, a front wall, half end and bottom walls, of a roll holder adapted to be removably attached to said camera body for completing the camera and including a rear wall, half end and bottom walls all complementary in shape to the walls of the camera, also including walls forming complete spool chambers and a film passageway therebetween, one of said walls including an exposure aperture, a shutter for covering and uncovering said aperture, cooperating latch elements on the camera body and roll holder for holding the latter on the former, a movable handle for operating said latch elements, said handle being also connected to the shutter to operate the shutter.

3. In a roll holding camera the combination with an incomplete camera body comprising a top wall in the form of a box-like housing, a front wall, half end and bottom walls, of a roll holder adapted to be removably attached to said camera body for completing the camera and including a rear wall, half end and bottom walls all complementary in shape to the walls of the camera, also including walls forming complete spool chambers and a film passage way therebetween, one of said walls including an exposure aperture, a shutter for covering and uncovering said aperture, cooperating latch elements on the camera body and roll holder for holding the latter on the former, a slidably mounted handle connected to said shutter and adapted to engage and operate said latch elements at the ends of its sliding movement whereby said shutter may be operated in advance of said latch elements.

4. In a roll holding camera the combination with an incomplete camera body comprising a top wall in the form of a box-like housing, a front wall, half end and bottom walls, of a roll holder adapted to be removably attached to said camera body for completing the camera and including a rear wall, half end and bottom walls all complementary in shape to the walls of the camera, also including walls forming complete spool chambers and a film passage way therebetween, one of said walls including an exposure aperture, a shutter for covering and uncovering said aperture, cooperating latch elements on the camera body and roll holder for holding the latter on the former, one of said latch elements comprising an elongated member with lugs projecting from each end, a handle slidably mounted to move between said lugs and operatively connected to the shutter to open and close the latter, during movement between said lugs, said handle being adapted to engage and move a lug to operate said latch elements after said shutter has been first moved by said handle.

5. In a roll holding camera the combination with an incomplete camera body comprising a top wall in the form of a box-like housing, a front wall, half end and bottom walls, of a roll holder adapted to be removably attached to said camera body for completing the camera and including a rear wall, half end and bottom walls all complementary in shape to the walls of the camera, also including walls forming complete spool chambers and a film passage way therebetween, one of said walls including an exposure aperture, a shutter for covering and uncovering said aperture, cooperating latch elements on the camera body and roll holder for holding the latter on the former, one of said latch elements comprising an elongated member with lugs projecting from each end, a handle slidably mounted to move between said lugs and operatively connected to the shutter to open and close the latter, during movement between said lugs, said handle being adapted to engage and move a lug to operate said latch elements after said shutter has been first moved by said handle, and a second latch adapted to retain said handle in a position in which the shutter is operative to close said exposure aperture whereby film in the magazine may be protected from light when the magazine is removed from the camera body.

6. In a roll holding camera the combination with an incomplete camera body comprising a top wall in the form of a box-like housing, a front wall, half end and bottom walls, of a roll holder adapted to be removably attached to said camera body for completing the camera and including a rear wall, half end and bottom walls all complementary in shape to the walls of the camera, also including walls forming complete spool chambers and a film passage way therebetween, one of said walls including an exposure aperture, a shutter for covering and uncovering said aperture, cooperating latch elements on the camera body and roll holder for holding the latter on the former, one of said latch elements comprising an elongated member with lugs projecting from each end, a handle slidably mounted to move between said lugs and operatively connected to the shutter to open and close the latter, during movement between said lugs, said handle being adapted to engage and move a lug to operate said latch elements after said shutter has been first moved by said handle, and a second latch adapted to retain said handle in a position in which the shutter is operative to close said exposure aperture whereby film in the magazine may be protected from light when the magazine is removed from the camera body, and means carried by the camera for releasing said latch when said magazine is again attached to the camera body.

7. A roll holder for incomplete cameras including a front wall, half end walls, a complete top wall and flanged half bottom walls, and comprising complete spool chambers spaced by a film passage way, an exposure frame in one side of said film passage way, a movable back for said roll holder including half end walls and half a bottom wall, the movable back forming an exterior wall complemental in shape to the walls of the camera and forming with said camera walls a smooth outside contour.

8. A roll holder for incomplete cameras including a front wall, half end walls, a complete top wall and flanged half bottom walls, all having a suitable exterior finish, said roll holder comprising spool chambers spaced by a film passage-way, an exposure frame in one side of the film passage-way, all of said parts being adapted to fit into said incomplete camera, said roll holder also including a movable back including half end and bottom walls all having a suitable exterior finish, and a hinge connection between said movable back and roll holder on which said back may move when the roll holder is on or off of the camera body.

9. In a roll holding camera, the combination with a camera body including a recess between a top wall, and part flanged end and bottom walls, and an objective, of a roll holder adapted to fit into said recess, projections on the roll holder adapted to engage portions of the camera body, said projections being accurately faced to locate said roll holder in the exact focal plane of the objective.

10. In a roll holding camera, the combination with a camera body including a recess between a top wall, and part flanged end and bottom walls, and an objective, of a roll holder adapted to fit into said recess, cooperating projections and depressions carried by the roll holder and camera body adapted to be engaged to locate and retain two walls of the roll holder and camera in operative relation, and cooperating latch elements on opposite walls of the camera body and roll holder for holding said walls in operative relationship, at least one of said latch elements being movably mounted for engaging and disengaging said latch elements.

11. A roll holder for cameras including a light tight film housing comprising a pair of substantially cylindrical spool chambers connected by a narrow film passage-way having spaced walls opening at its ends into each spool chamber and including an exposure frame in one spaced wall, one end wall of substantially the shape of the spool chambers and film passage-way in crosssection, the other end wall projecting from said film passage-way and covering approximately half of the substantially cylindrical spool chambers, a movable back for the roll holder separable therefrom through a line passing approximately half-way through the substantially cylindrical spool chambers.

12. A roll holder for cameras including a light tight film housing comprising a pair of substantially cylindrical spool chambers connected by a narrow film passage-way having spaced walls opening at its ends into each spool chamber and including an exposure frame in one spaced wall, one end wall of substantially the shape of the spool chambers and film passage-way in cross section, the other end wall projecting from said film passage-way and covering approximately half of the substantially cylindrical spool chambers, a roller curtain mounted adjacent one spool chamber and near said exposure frame, said curtain being adapted to cover and uncover said exposure frame.

13. A roll holder for cameras including a light tight film housing comprising a pair of substantially cylindrical spool chambers connected by a narrow film passage-way having spaced walls opening at its ends into each spool chamber and including an exposure frame in one spaced wall, one end wall of substantially the shape of the spool chambers and film passage-way in crosssection, the other end wall projecting from said film passage-way and covering approximately half of the substantially cylindrical spool chambers, a roller curtain mounted adjacent one spool chamber and near said exposure frame, said curtain being adapted to cover and uncover said exposure frame, and a slidably mounted handle carried by an end wall of the roll holder for manually operating said curtain shutter.

14. A roll holder for cameras including a light tight film housing comprising a pair of substantially cylindrical spool chambers connected by a narrow film passage-way having spaced walls opening at its ends into each spool chamber and including an exposure frame in one spaced wall, one end wall of substantially the shape of the spool chambers and film passage-way in crosssection, the other end wall projecting from said film passage-way and covering approximately half of the substantially cylindrical spool chambers, a roller curtain mounted adjacent one spool chamber and near said exposure frame, said curtain being adapted to cover and uncover said exposure frame, a slidably mounted handle carried by an end wall of the roll holder for manually operating said curtain shutter, and a latch member adapted to retain said handle in a position in which the curtain covers the exposure frame.

15. A roll holder for cameras including a light tight film housing comprising a pair of substantially cylindrical spool chambers connected by a narrow film passage-way having spaced walls opening at its ends into each spool chamber and including an exposure frame in one spaced wall, one end wall of substantially the shape of the spool chambers and film passage-way in crosssection, the other end wall projecting from said film passage-way and covering approximately half of the substantially cylindrical spool chambers, a roller curtain mounted adjacent one spool chamber and near said exposure frame, said curtain being adapted to cover and uncover said exposure frame, a slidably mounted handle carried by an end wall of the roll holder for manually operating said curtain shutter, a latch member adapted to retain said handle in a position in which the curtain covers the exposure frame, and a concealed releasing member carried by said latch preventing the manual release thereof.

16. A roll holder for cameras comprising a pair of spaced spool chambers, a narrow enclosed film passageway connecting said spool chambers, an exposure aperture in the film passageway, a roller curtain mounted inside the film passageway adjacent a spool chamber, a sprocket for measuring film also mounted in the narrow film passageway adjacent the other spool chamber, a back hinged to the roll holder and including a film winding mechanism and gear, and a gear carried by the sprocket adapted to engage said first mentioned gear, and means cooperating with the sprocket for normally holding the film winding mechanism against movement.

17. A roll holder for cameras comprising a pair of spaced spool chambers, a narrow enclosed film passageway connecting said spool chambers, an exposure aperture in the film passageway, a roller curtain mounted inside the film passageway adjacent a spool chamber, a sprocket for measuring film also mounted in the narrow film passageway adjacent the other spool chamber, a back hinged to the roll holder and including a film winding mechanism and gear, and a gear carried by the sprocket adapted to engage said first mentioned gear, a winding spool in one film chamber, a gear attached to the spool, means cooperating with the sprocket and winding spool, gear for normally hoding both against movement.

18. A roll holder for cameras comprising a pair of spaced spool chambers, a narrow enclosed film passageway connecting said spool chambers, an exposure aperture in the film passageway, a roller curtain mounted inside the film passageway adjacent a spool chamber, a sprocket for measuring film also mounted in the narrow film passageway adjacent the other spool chamber, a back hinged to the roll holder and including a film winding mechanism and gear, and a gear carried by the sprocket adapted to engage said first mentioned gear, a winding spool in one film chamber, a gear attached to the spool, a moveably mounted spring pressed lever having portions for engaging the gear and sprocket for normally holding both against movement.

19. A roll holder for cameras comprising a pair of spaced spool chambers, a narrow enclosed passageway connecting the two spool chambers having an exposure frame therein, a sprocket and shaft enclosed in the passageway adjacent one spool chamber, a spring curtain enclosed in the passageway adjacent the other spool chamber, said curtain being movable across the exposure frame, a film spool and shaft in one spool chamber, a gear on the spool shaft outside of the spool chamber, a notched disk on the sprocket shaft outside of the passageway, and a spring operated latch adapted to simultaneously engage or disengage the gear and notched disk.

20. A roll holder for cameras including film and sprocket winding gearing and adapted to receive a roll holder, and comprising a pair of spaced spool chambers, a narrow enclosed passageway connecting the two spool chambers having an exposure frame therein, a sprocket and shaft enclosed in the passageway adjacent one spool chamber, a spring curtain enclosed in the passageway adjacent the other spool chamber, said curtain being movable across the exposure frame, a film spool and shaft in one spool chamber, a gear on the spool shaft outside of the spool chamber, a notched disk on the sprocket shaft outside of the passageway, said gear and notched disk being so positioned that the film and sprocket winding gearing on the camera may operably connect the sprocket and film spool when said magazine is mounted on said camera, and a spring operated latch adapted to simultaneously engage or disengage the gear and notched disk.

21. A roll holder for cameras comprising a pair of spaced semi-cylindrical spool chambers, a narrow light-tight passageway connecting the spool chambers through which film may pass, a raised flat rib on each spool chamber accurately faced to a predetermined size for locating the roll holder in a camera, a pair of film guiding rails inside the light-tight film passageway accurately faced to a predetermined dimension with respect to the ribs on the spool chambers whereby film may be accurately positioned with respect to the roll holder locating ribs.

JOSEPH MIHALYI.